United States Patent Office

3,042,982
Patented July 10, 1962

3,042,982
EXPENDIBLE MOULDS FOR PATTERNS IN PRECISION CASTING
Norman Duncan Gerard Mountford, Castle Donington, and Charles William Morley, Alvaston, England, assignors to Rolls-Royce Limited, Derby, England, a company of Great Britain
No Drawing. Filed June 24, 1959, Ser. No. 822,424
Claims priority, application Great Britain July 7, 1958
2 Claims. (Cl. 22—195)

This invention is for means of making expendable patterns for use in the precision casting of metals.

In the precision casting of metals a mould is formed around a pattern of the object to be cast, such pattern being of an expendable material, e.g. wax, and when the mould has been formed the pattern is removed usually by melting it, leaving the mould with a hollow interior into which the metal is cast.

It has been a usual practice to form such expendable patterns by casting them in steel dies but these dies are expensive to make and this invention has for its object a cheaper method of producing expendable patterns.

According to the present invention there is provided a method of making an expendable pattern for use in the precision casting of metals comprising forming a mould around a model of the article, said mould being made of a material which is hardenable by carbon dioxide, hardening the mould so formed by carbon dioxide, forming the expendable pattern therein, and removing the mould from the expendable pattern so produced.

Preferably the mould is made of a material which can be dispersed by a liquid, and the mould is removed from the expendable pattern by being dispersed by a liquid.

Preferably the liquid is water.

The model around which the mould is formed may conveniently be of wood, the mould being split if necessary for removal from the wooden model.

The mould may be sprayed internally with rubber latex to give it a good surface which the wax of the expendable pattern will not penetrate.

A suitable composition for a mould hardenable by carbon dioxide and dispersable in water is sodium carboxy methyl cellulose plus sodium carbonate, a refractory and sodium silicate solution.

One specific example of such a mould is as follows:

| | Pounds |
|---|---|
| Courlose A 200 grade (or F 300 grade) | 12 |
| Anhydrous sodium carbonate (soda ash) | 6 |
| Redhill "H" silica sand | 224 |
| Zircosil "D" (Zircon, all passing 200 mesh B.S. 410: 1943 sieve) | 2½ |
| C 112 sodium silicate solution | 20 |

Another specific example is as follows:

| | |
|---|---|
| Courlose F 700 grade | 1 lb. |
| Anhydrous sodium carbonate | ½ lb. |
| $Na_2CO_3 \cdot 10H_2O$ | ½ lb. |
| Redhill "H" silica sand | 17 lbs. 13 oz. |
| Fine red iron oxide (paint pigment grade) | 2½ oz. |
| C 112 sodium silicate solution | 1¾ lbs. |

Yet another specific example is as follows:

| | Pounds |
|---|---|
| Congleton sand | 250 |
| Courlose F 300 | 6 |
| Soda ash | 1 |
| C 112 sodium silicate solution | 12 |

"Courlose" is sodium carboxy methyl cellulose. A 200 grade contains about 18% sodium chloride impurity, which arises as by-product during manufacture. F 300 and F 700 are pure products, containing no sodium chloride. Sodium carboxy methyl cellulose is a polymer which can be characterised by the viscosity of its aqueous solution.

A 200 and F 300 give solutions in water such that the viscosity of a 1% solution at 25° C. is 7–15 cp. For F 700 the corresponding figure is 20–40 cp.

C 112 sodium silicate solution has the following properties:

Specific gravity 112° Tw. or 1.56
Molar ratio $SiO_2:Na_2O = 2.05:1$ (mean figures)
$Na_2O = 15.2\%$
$SiO_2 = 30.4\%$
Total solids = 45.6%
Viscosity at 20° C. = 900 centipoises.

The method is to place the wooden model in a flask, and pack in the slightly damp moulding mixture around the model, apply carbon dioxide to the mould to harden it, splitting the mould into two or more parts if necessary to allow the wooden model to be removed, spray the interior surfaces of the mould with rubber latex and then to place the parts together and inject in wax to fill the hollow interior of the mould and cast the wax pattern.

When the wax has set, the mould and wax pattern casting are immersed in water when the mould will gradually break up to form a slurry falling away from and leaving the wax pattern casting which can then be removed, and subsequently used as an expendable wax pattern in the investment casting process.

We claim:

1. The method of making an expendible wax pattern for use in the precision casting of metals comprising forming a mould around a model of the article, said mould being formed from a composition consisting essentially of (A) sodium carboxy methyl cellulose, sodium carbonate, to the order of one-sixth to one-half as much by weight as (A), a refractory, to the order of 20 to 40 times as much by weight as (A) and sodium silicate solution to the order of twice as much by weight as (A), hardening the mould so formed solely by the use of carbon dioxide, removing the model from the mould, coating the interior of the mould with rubber latex, casting an expendible wax pattern in the mould and removing the mould from the fragile pattern so produced by dispersing the mould material with water.

2. The method of making an expendible wax pattern for use in the precision casting of metals comprising forming a mould around a model of the article, said mould being formed from a composition consisting essentially of sodium carboxy methyl silicate, sodium carbonate, a refractory and sodium silicate solution capable of being hardened sufficiently for use solely by the application of carbon dioxide and being dispersible by water without further treatment, hardening the mould so formed solely by the application of carbon dioxide, removing the model from the mould, coating the interior of the mould to render it impervious to wax, casting an expendible wax pattern in the mould and removing the mould from the fragile pattern so produced by dispersing the mould material with water.

References Cited in the file of this patent
UNITED STATES PATENTS

| 2,530,853 | Brennan | Nov. 21, 1950 |
| 2,836,867 | Bean | June 3, 1958 |

(Other references on following page)

FOREIGN PATENTS 727,264    Great Britain _____ Mar. 30, 1955

OTHER REFERENCES

Foundry Trade Journal, pages 279–282, March 31, 1949.

Steel, pages 66–69, March 19, 1951.

The Foundry, pages 82–83, 205–210, 212, vol. 77, Issue 11, November 1949.

Foundry, pages 128–135, March 1956.

Materials and Methods, pages 1466–1468, December 1946.